United States Patent Office 2,996,357
Patented Aug. 15, 1961

2,996,357
PRODUCTION OF NITROGEN-PHOSPHORIC ACID COMPOUNDS
Alfred Köster, Dusseldorf-Oberkassel, and Karl-Heinz Worms, Dusseldorf, Germany, assignors to Henkel & Cie., G.m.b.H., Dusseldorf-Holthausen, Germany, a corporation of Germany
No Drawing. Filed June 4, 1957, Ser. No. 663,550
Claims priority, application Germany June 8, 1956
7 Claims. (Cl. 23—107)

This invention relates to new and useful improvements in the production of nitrogen-phosphoric acid compounds.

Nitrogen-phosphoric acid compounds are used as anti-corrosion agents, as additives for washing agents, and detergents, and for the softening of water. The same were conventionally produced by reacting gaseous ammonia with phosphorous pentoxide either in vapor form or in a fine dispersion in a paraffin oil. The reaction was generally effected in the absence of any substantial quantities of water, since it is well known that phosphorous pentoxide has an affinity for water. This conventional method for the production of nitrogen-phosphoric acid compound, however, presented serious difficulties in commercial operation as reaction did not readily proceed and could not be carried to completion even with the use of long reaction times.

One object of this invention is the novel method for the production of nitrogen gas-phosphoric acid compounds, which overcomes the above-mentioned difficulties. This, and still further objects will become apparent from the following description:

In accordance with the invention, it has now been surprisingly found that the reaction between the phosphorous pentoxide and ammonia may be effected in the presence of large quantities of water with the obtaining of reaction products which are very similar to those obtained by the conventional methods, and that the difficulties encountered by the conventional methods, such as, for example, the low yield, even with long reaction times may be overcome if the phosphorous pentoxide is reacted with an aqueous solution of the ammonia.

In accordance with the invention, therefore, the nitrogen-phosphorous acid compounds are produced by contacting phosphorous pentoxide with an aqueous ammonia solution, which preferably should have as high a concentration of ammonia. The smallest concentration of the aqueous ammonia solution may be 15% by weight. Preferably it is used as an aqueous ammonia solution with a concentration of 20–30% by weight. The pH-value of the aqueous ammonia solution may be in the range of about 9 to 12.

The phosphorous pentoxide may be added to the aqueous ammonia solution in any desired manner, such as, for example, either in separate batches or continuously. The reaction, however, will only proceed as long as the reaction solution stays within the alkaline region.

Within a preferred embodiment of the invention it has therefore been found preferable to introduce gaseous ammonia into the aqueous reaction solution in an amount sufficient to maintain the solution alkaline. In this way it is possible to add relatively large amounts of phosphorous pentoxide to a given quantity of ammonia solution.

The phosphorous pentoxide may be continuously introduced into the aqueous ammonium solution while gaseous ammonia is continuously introduced in an amount sufficient to maintain the ammonia concentration in the solution substantially constant during the reaction.

The addition of the phosphorous pentoxide and the ammonia may be continued in this connection until the viscosity of the reaction mixture reaches a point where further operation becomes undesirable. It is preferable to keep the reaction mixture in motion during the reaction, such as, for example, by stirring, and, furthermore, to provide for the removal of the reaction heat by cooling. The reaction is carried out at temperatures between −80 and 100° C., but temperatures from 15 to 60° C. have been found to be within the preferred temperature range. It is not necessary to carry out the reaction at elevated pressure.

The nitrogen-phosphoric acid compound is formed in the aqueous solution and it is possible to isolate the same by evaporation, as, for example, under vacuum or by precipitation from the aqueous solution using a suitable water-miscible liquid, such as methanol, ethanol, or acetone.

For many purposes, however, the nitrogen-phosphoric acid compound may be used in the aqueous form in which it is formed. Thus, for example, in the production of water softeners, washing agents, detergents, or anti-corrosion agents, the aqueous reaction solution may be subjected to a spray-drying jointly with the other material forming the composition.

The structure of the products obtained in accordance with the invention is not homogeneous, and by chromatographic analysis it is possible to show that nitrogen and phosphorous compounds of very different molecular size are present in the reaction mixture ranging from low molecular compounds to highly condensed compounds. Despite this chemical heterogeneity, it is possible, by maintaining specific reaction conditions, to prepare in a reproducible manner products having the same overall composition and properties.

The nitrogen-phosphoric acid compounds obtained in accordance with the invention correspond extensively in their composition and properties to the substances which were obtained by the conventional methods. The content of amide and imide nitrogen is also within the same order of magnitude as in the case with the conventional products. Such products are described par example in D.R.P. 715,540 and Dissertation Herbert Fischer, Dresden 1941, pages 66–78.

The products in accordance with the invention may be used in the identical manner for the identical purposes as the prior art products, such, for example, as anti-corrosion agents, additions for washing agents, detergents, and for the softening of water.

The following examples are given by way of illustration and not limitation:

*Example 1*

To 400 cc. of concentrated aqueous ammonia solution (24%) 150 grams of phosphorous pentoxide were added in separate portions with vigorous stirring over a course of five minutes. During the reaction the temperature raised, but remained below 50° C. The reaction product was precipitated from the viscous solution obtained in this manner by adding about 200 cc. of methyl alcohol. Thereupon the product was filtered off and dried. The yield was 228 grams. The substance contained 28% phosphorous and 16% nitrogen. 13.1% of the total nitrogen was present in the form of amide or imide nitrogen.

*Example 2*

To 350 cc. concentrated aqueous ammonia solution (24%) 220 grams phosphorous pentoxide were added in separate portions with vigorous stirring over a course of about five minutes. During the addition of the phosphorous pentoxide, gaseous ammonia was introduced into the reaction mixture at a rate of about 2 liters per minute. During the reaction the temperature raised, but remained below 50° C. After cooling, 150 cc. of ethyl alcohol were added and the precipitated reaction product was filtered off and dried. The yield was 310 grams. The substance contained 30.5% phosphorous and 16.5% nitrogen. 12.8% of the total nitrogen was present in the form of amide or imide nitrogen.

*Example 3*

350 cc. of concentrated aqueous ammonia solution (24%) were cooled to a temperature between —5 and 0° C. by means of ice and sodium chloride. 150 grams of phosphorous pentoxide were added in such portions thereto with vigorous stirring over a course of five minutes. During the addition of the phosphorous pentoxide gaseous ammonia was introduced into the reaction mixture at a rate of about 2 liters per minute. Thereupon the reaction product was precipitated by the addition of 150 cc. ethyl alcohol, filtered and dried. The yield was 230 grams. The substance contained 26.8% phosphorous and 16.1% nitrogen. 16.9% of the total nitrogen was in the form of amide or imide nitrogen.

*Example 4*

The product obtained as described in the Example 1, dissolved in water (about 2%) is an excellent softening agent.

We claim:

1. In the process for the preparation of nitrogen-phosphoric acid compounds in which phosphorous pentoxide and ammonia are reacted to form nitrogen-phosphoric acid compounds, the improvement which comprises effecting the reaction by contacting at a temperature between about —80 and 100° C. phosphorous pentoxide in solid form with an aqueous ammonia solution having a concentration of from 15% to saturation and recovering the nitrogen-phosphoric acid compound formed.

2. Improvement according to claim 1 which includes separating said nitrogen-phosphoric acid compound from the aqueous solution.

3. Improvement according to claim 2 in which the separation is effected by precipitating the nitrogen-phosphoric acid compound with a water-miscible organic solvent selected from the group consisting of methanol, ethanol and acetone.

4. Improvement according to claim 1 which includes introducing gaseous ammonia into said aqueous solution during said contacting in an amount sufficient to maintain the reaction condition alkaline.

5. Improvemet according to claim 4 in which the phosphorous pentoxide is substantially continuously added to the aqueous ammonium solution and in which the gaseous ammonia is substantially continuously introduced into the solution in an amount sufficient to maintain the ammonium concentration in the solution substantially constant.

6. Improvement according to claim 1 in which said contacting is carried out at a temperature of between 15 and 60° C.

7. Improvement according to claim 1 in which the concentration of ammonia is between 20 and 30% by weight.

References Cited in the file of this patent

UNITED STATES PATENTS

| | | |
|---|---|---|
| 1,838,431 | Milligan | Dec. 29, 1931 |
| 2,122,122 | Woodstock | June 28, 1938 |
| 2,713,536 | Driskell | July 19, 1955 |
| 2,717,198 | Jones | Sept. 6, 1955 |
| 2,839,375 | Christian | June 17, 1958 |